US012767396B2

(12) United States Patent
Lee et al.

(10) Patent No.: US 12,767,396 B2
(45) Date of Patent: Oct. 20, 2026

(54) SLIDING-LOCKING CRISPER BOX

(71) Applicants: PRAIRIE PLASTIC HARDWARE CO., LTD., Dongguan (CN); FREE-FREE INDUSTRIAL CORP, Taipei City (TW)

(72) Inventors: Tsung-Han Lee, Taipei City (TW); Sheng-Chih Yang, Taipei City (TW)

(73) Assignees: PRAIRIE PLASTIC HARDWARE CO., LTD., Dongguan (CN); FREE-FREE INDUSTRIAL CORP, Taipei City (TW)

( * ) Notice: Subject to any disclaimer, the term of this patent is extended or adjusted under 35 U.S.C. 154(b) by 169 days.

(21) Appl. No.: 18/844,898

(22) PCT Filed: Jun. 15, 2023

(86) PCT No.: PCT/CN2023/100357
§ 371 (c)(1),
(2) Date: Sep. 6, 2024

(87) PCT Pub. No.: WO2024/254810
PCT Pub. Date: Dec. 19, 2024

(65) Prior Publication Data

US 2026/0184474 A1 Jul. 2, 2026

(51) Int. Cl.
*B65D 45/32* (2006.01)
*A47J 47/10* (2006.01)
*B65D 53/02* (2006.01)

(52) U.S. Cl.
CPC ............ *B65D 45/322* (2013.01); *A47J 47/10* (2013.01); *B65D 53/02* (2013.01)

(58) Field of Classification Search
CPC ...... B65D 45/322; B65D 53/02; B65D 45/16; B65D 2543/00101; A47J 47/10; A47J 47/02; A47J 47/06; A45C 11/20
(Continued)

(56) References Cited

U.S. PATENT DOCUMENTS 5,887,745 A * 3/1999 Wood .................... B65D 45/18 220/326
6,253,947 B1 * 7/2001 Yang .................... B65D 45/18 206/508
(Continued)

FOREIGN PATENT DOCUMENTS

CN 101342962 A 1/2009
CN 211483271 U 9/2020
(Continued)

OTHER PUBLICATIONS

English Machine Translation of EP-4042916-A1 (Year: 2022).*
Search Report dated Sep. 12, 2023 of the parent PCT patent application No. PCT/CN2023/100357.

*Primary Examiner* — Laura E. Parker
(74) *Attorney, Agent, or Firm* — HDLS IPR SERVICES; Chun-Ming Shih

(57) ABSTRACT

A sliding-locking crisper box includes a box body, an upper cover, and a sliding sleeve. The box body has an opening and a flange having a first fixed structure. The upper cover covers the opening and has two first and two second side frame. The first side frame has a limiting portion provided with a slot and a limiting side-cover. The sliding sleeve is arranged on the second side frame and may switch between a locked position and an unlocked position. The sliding sleeve has a plug end, a second fixed structure, and an anti-lift plate. The sliding sleeve locks the upper cover on the box body when the sliding sleeve is at the locked position. The plug end, the anti-lift plate, and the second fixed structure are separated from the limiting side-cover, the flange, and the first fixed structure when the sliding sleeve is at the unlocked position.

9 Claims, 13 Drawing Sheets

(58) Field of Classification Search
USPC .................. 220/320, 315, 322, 378; 206/1.5
See application file for complete search history.

(56) References Cited

U.S. PATENT DOCUMENTS

| | | | | |
|---|---|---|---|---|
| 2007/0095837 | A1* | 5/2007 | Meier | B65D 45/16 220/784 |
| 2015/0136769 | A1* | 5/2015 | Quinn | A47J 36/10 220/240 |

FOREIGN PATENT DOCUMENTS

| | | | | |
|---|---|---|---|---|
| EP | 4042916 | A1 * | 8/2022 | A47J 47/02 |
| JP | H0519148 | U | 3/1993 | |

* cited by examiner

SLIDING-LOCKING CRISPER BOX

CROSS-REFERENCE TO RELATED APPLICATION

This application is the National Phase of PCT International Application No. PCT/CN2023/100357 filed on Jun. 15, 2023. The entire disclosures of the above application are all incorporated herein by reference.

BACKGROUND

Technical Field

The present disclosure relates to a crisper box, particularly to a sliding-locking crisper box that may quickly and easily lock and unlock the upper cover with sliding-locking sleeves.

Description of Related Art

With the rise of environmental awareness, sealed bags and crisper boxes are widely used in daily life to effectively seal and preserve items such as food or medicine. Most of the known crisper boxes usually achieve a sealing effect through locking a rubber sealing ring of an upper cover to an inner edge of a box body. Although by above mechanism, a user may quickly seal the box body with the upper cover, opening the sealed upper cover requires a significant amount of time and effort, which causes inconvenience in use. How to design a crisper box that can easily and quickly lock and unlock the upper cover to the box body is an urgently desired improvement.

In view of the above, the inventor seeks to overcome the aforementioned drawbacks associated with the current technology and aims to provide an effective solution through extensive researches along with utilization of academic principles and knowledge.

SUMMARY

A primary objective of the present disclosure is to quickly and easily lock and unlock the upper cover on the box body, and to avoid the locked sliding sleeves from shaking in any direction-left, right, front, back, or up and down-relative to the upper cover or the box body.

To accomplish the aforementioned objective, the present disclosure provides a sliding-locking crisper box comprising a box body, an upper cover, and a pair of sliding sleeves, the box body comprises a bottom plate, a surrounding wall around the bottom plate, an opening is defined by the surrounding wall, a flange is extended from the opening of the surrounding wall and extended toward an outside of the box body, two first fixed structures are respectively arranged on opposite sides of the flange, the upper cover is configured to hermetically cover the opening along a vertical direction, the upper cover comprises a pair of opposite first side frames and a pair of opposite second side frames, each of the first side frames comprises a pair of limiting portions, each of the limiting portions comprises a slot and a limiting side-cover, the sliding sleeves are arranged opposite to each other in correspondence with the second side frames, each of the sliding sleeves is configured to slide along the first side frames to switch between a locked position and an unlocked position, each of the sliding sleeves comprises a pair of plug ends, a second fixed structure, and an anti-lift plate, each of the plug ends comprises a positioning piece, when each of the sliding sleeves is at the locked position, each of the positioning pieces is inserted and fixed in each of the slots, each of the limiting side-covers is configured to block an outside of each of the plug ends, each of the anti-lift plates is configured to block each of the flanges along the vertical direction, each of the second fixed structures is locked with each of the first fixed structures, when each of the sliding sleeves is at the unlocked position, each of the plug ends is separated from each of the limiting side-covers, each of the anti-lift plates is separated from each of the flanges, each of the second fixed structures is separated from each of the first fixed structures.

Another aspect of the present disclosure provides that each of the sliding sleeves comprises a pair of side strips and a connecting strip, the connecting strip is arranged corresponding to one of the second side frames, each of the side strips is connected to one of two ends of the connecting strip and covers a part of each first side frame, each of the plug ends is arranged on an end of each of the side strips away from the connecting strip.

Another aspect of the present disclosure provides that in each of the sliding sleeves, the anti-lift plate is extended from an inner wall of the connecting strip and is misaligned with the flange in the vertical direction.

Another aspect of the present disclosure provides that in each of the sliding sleeves, a number of the second fixed structure is two, each of the second fixed structures is arranged on an inner wall of each of the side strips.

Another aspect of the present disclosure provides that each of the first fixed structures is a clamping strip, each of the second fixed structures is a wedge block, two ends of each of the clamping strips respectively comprises a first clamping slope, each of the wedge blocks comprises a second clamping slope, each of the second clamping slopes is buckled with each of the first clamping slopes to fix each of the sliding sleeves on the box body when each of the sliding sleeves is at the locked position, each of the second clamping slopes is separated from each of the first clamping slopes when each of the sliding sleeves is at the unlocked position.

Another aspect of the present disclosure provides that each of the first side frames comprises a pair of positioning convex-strips, each of the positioning convex-strips is arranged corresponding to each of the limiting portions, each of the side strips comprises a pair of positioning notches arranged at intervals, each of the positioning convex-strips is selectively stuck inside one of the positioning notches of the corresponded side strip.

Another aspect of the present disclosure provides that the upper cover comprises a pair of indentations, each of the indentations is arranged beside each of the second side frames, each of the indentations comprises a stopping surface, each of the connecting strips comprises a barb, each of the barbs is buckled with corresponding one of the stopping surfaces when each of the sliding sleeves is at the unlocked position.

Another aspect of the present disclosure provides that each of the positioning pieces is extended from the corresponded plug end along the first side frames.

Another aspect of the present disclosure provides that each of the plug ends is abutted against corresponding one of the limiting portions when each of the sliding sleeves is at the locked position.

Another aspect of the present disclosure provides that further comprising a sealing ring, the upper cover comprises a groove, the sealing ring is fixed in the groove and elastically abutted between the upper cover and the surrounding wall.

The present disclosure is able to quickly and easily lock and unlock the upper cover on the box body by sliding the sliding sleeves to switch between the locked position and the unlocked position, and avoid the sliding sleeves when locked from shaking in any direction—left, right, front, back, or up and down—relative to the upper cover or the box body.

DETAILED DESCRIPTION

Figure 1:
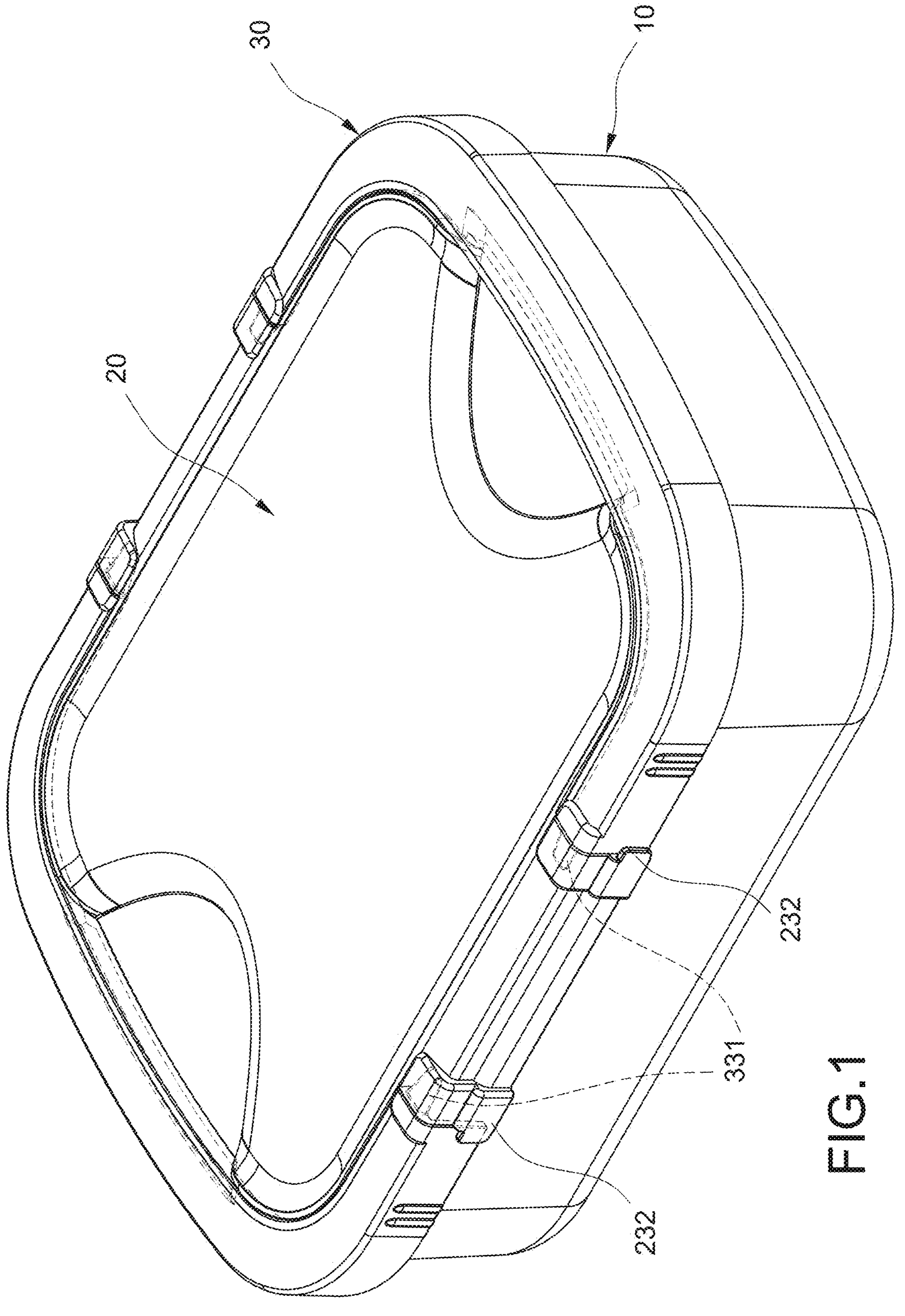
FIG. 1 is a perspective appearance view of the present disclosure.

It is to be understood that the terms for indicating positions and the location relation, for example "front", "rear", "left", "right", "front end", "rear end", "distal end", "longitudinal direction", "lateral direction", "vertical direction", "top" and "bottom", are based on the positions and the location relation disclosed in the drawings, and only used for disclosing the present disclosure and not used for indicating or implying the specified location of the device or the components or the specified structure and operation in certain location, thus the present disclosure is not intended to be limiting.

For example, the terms of "first", "second", "third", "forth" and "fifth" are used for illustrating each unit, component, area, layer and/or part. The component, the unit, the area, the layer and/or the part are not limited by the terms. These terms are only used for separating the element, the assembly, the area, the layer, or the part. Unless being clearly indicated according to the whole specification, the terms for example "the first", "the second", "the third", "the fourth" and "the fifth" are not used for implying the order or sequence.

The technical contents of the present disclosure will become apparent with the detailed description of embodiments and the accompanied drawings as follows. However, it shall be noted that the accompanied drawings are for illustrative purposes only such that they shall not be used to restrict the scope of the present disclosure.

Figure 2:
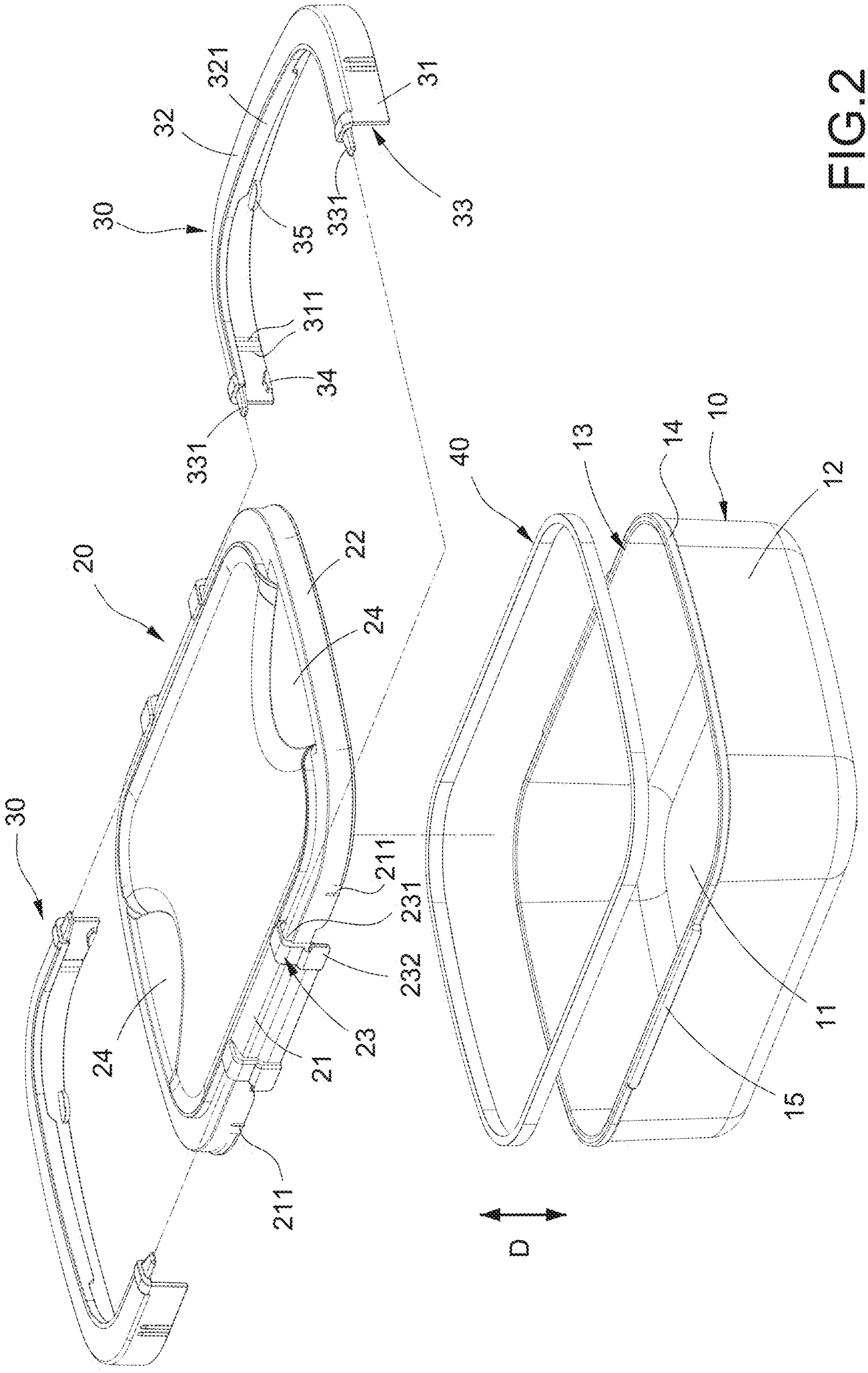
FIG. 2 is an exploded view of the present disclosure.
Figure 3:
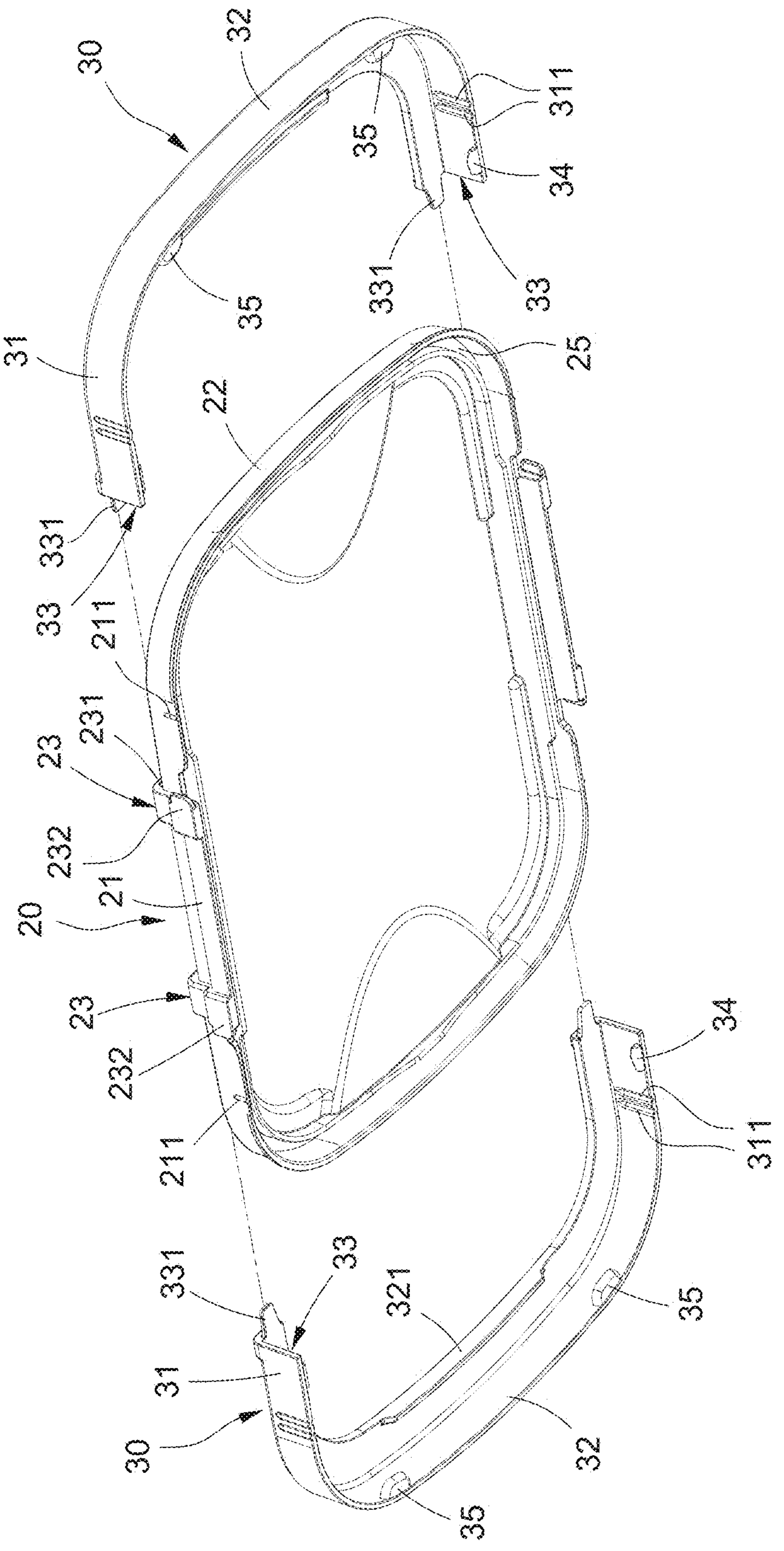
FIG. 3 is an exploded view of the upper cover and the sliding sleeves of the present disclosure.

The present disclosure provides a sliding-locking crisper box that is used to contain items such as food or medicine needing to keep fresh or moisture-proof. As shown in FIGS. 1, 2, and 3, the sliding-locking crisper box of the present disclosure includes a box body 10, an upper cover 20, and a pair of sliding sleeves 30.

Please first refer FIG. 1 and FIG. 2, the box body 10 includes a bottom plate 11 and a surrounding wall 12 around the bottom plate 11. In the embodiment, the bottom plate 11 is generally rectangular, but the bottom plate 11 is not limited to this specific shape. For example, the bottom plate 11 may also be square, circular or oval . . . etc. The surrounding wall 12 surrounds the bottom plate 11 to define a cavity (not shown in figures) and an opening 13 that communicate with to each other. A flange 14 is extended from the portion of the surrounding wall 12 defining the opening 13 and toward an outside of the box body 10. That is the flange 14 in the embodiment is generally rectangular corresponding to the bottom plate 11 and the surrounding wall 12. Opposite sides of the flange 14 respectively has a first fixed structure 15. In detail, the first fixed structures 15 in the embodiment are arranged respectively on two longer sides of the flange 14. The specific structure of the first fixed structure 15 will be explained in the following paragraphs, so further detail thereof is omitted here for brevity.

Please refer FIGS. 1, 2 and 3, the shape of the upper cover 20 is corresponding to the shape of the bottom plate 11, so the upper cover 20 in the embodiment is also generally rectangular. The upper cover hermetically covers the opening 13 of the surrounding wall 12 along a vertical direction D (depicted as an up-and-down direction in FIG. 2). The upper cover 20 has a pair of opposite first side frames 21 and a pair of opposite second side frames 22. In the embodiment, each first side frame 21 is corresponding to two longer sides of the surrounding wall 12, each second side frame 22 is corresponding to two shorter sides of the surrounding wall 12, but the scope of the present disclosure is not limited to this embodiment. Each first side frame 21 has a pair of limiting portions 23. The limiting portions 23 of each first side frame 21 are spaced apart from each other. Each limiting portion 23 defines a slot 231 and a limiting side-cover 232. In detail, please refer to FIG. 2, each slot 231 in the embodiment is defined on a top of each first side frame 21, each limiting side-cover 232 in the embodiment is formed at an outside of each first side frame 21. A plurality accommodation spaces (not labeled in figures) respectively for accommodating the plug ends 33 described later is respectively defined between each limiting side-cover 322 and each corresponding first side frame 21.

Please refer FIGS. 1, 2 and 3, the sliding sleeves 30 are arranged opposite to each other in correspondence with the second side frames 22. Each sliding sleeve 30 includes a pair of side strips 31 and a pair of connecting strip 32. Each connecting strip 32 is arranged corresponding to each second side frame 22. In each sliding sleeves 30, each side strip 31 is connected to a respective one of the two ends of the connecting strip 32, and each side strip 31 covers a part of each first side frame 21. Each sliding sleeve 30 has a pair of plug ends 33, at least one second fixed structure 34, and at least one anti-lift plate (baffling plate) 35. Each plug end 33 is arranged on an end of each side strip 31 away from the connecting strip 32. Each plug end 33 has a positioning piece 331 extended along the first side frames 21. The specific structures and the positions of the second fixed structure 34 and the anti-lift plate 35 are described in the following paragraphs, so further detail is omitted here for brevity.

Figure 4:
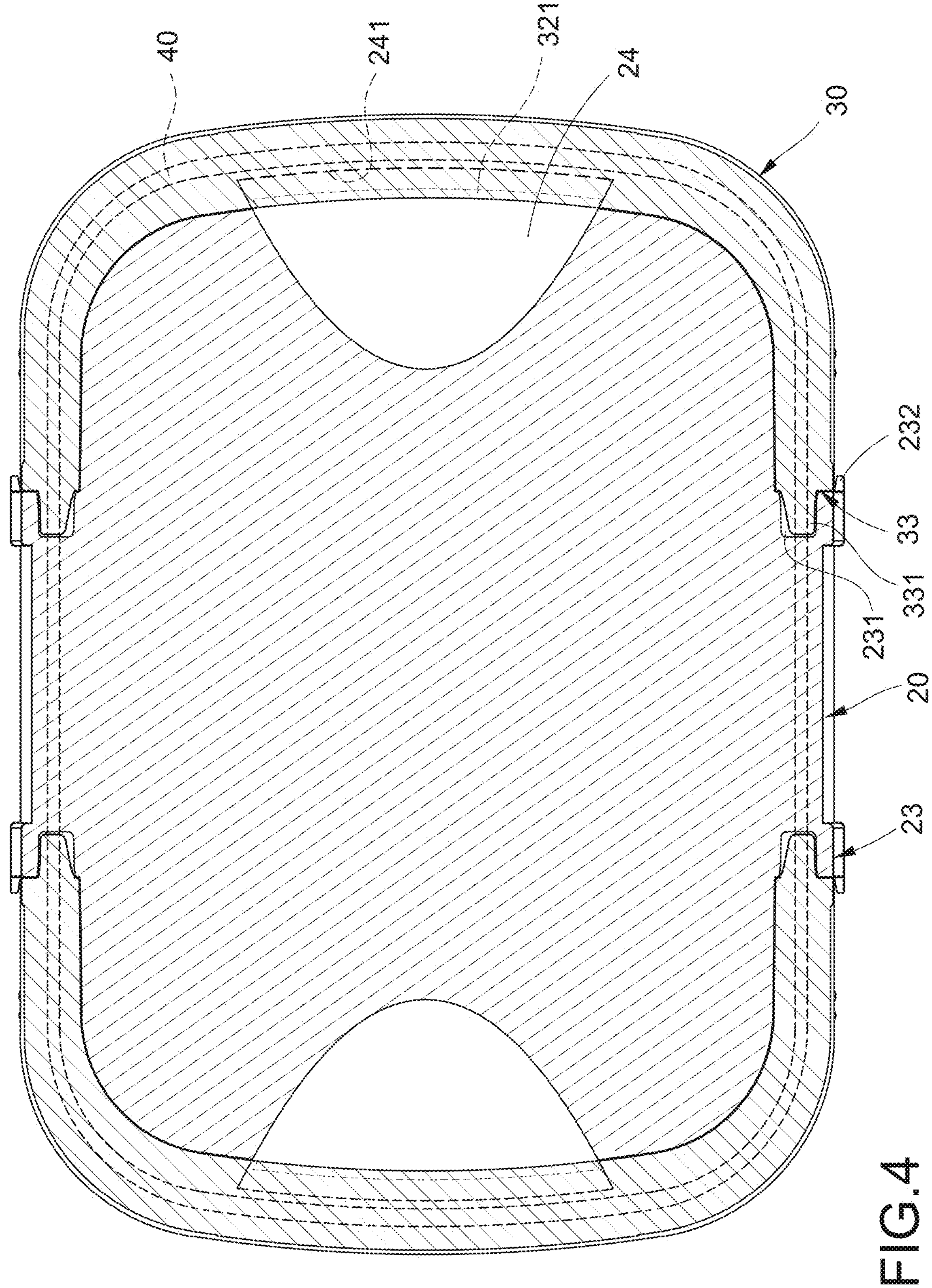
FIG. 4 is a cross-sectional top view of the present disclosure at the locked position.
Figure 9:
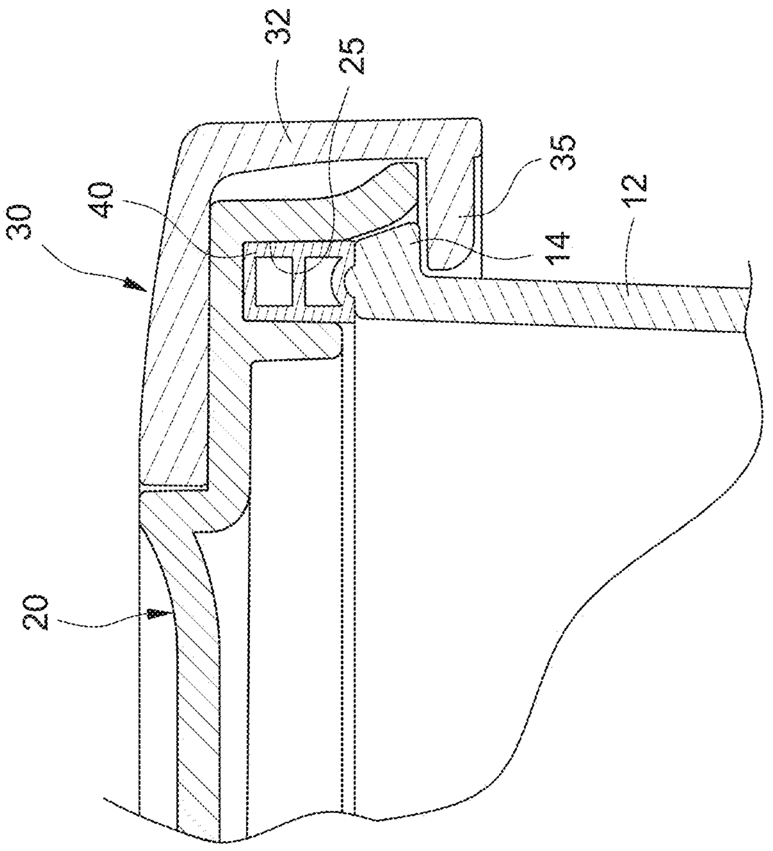
FIG. 9 is a cross-sectional view of the anti-lift(baffling) plate of the present disclosure at the locked position.
Figure 10:
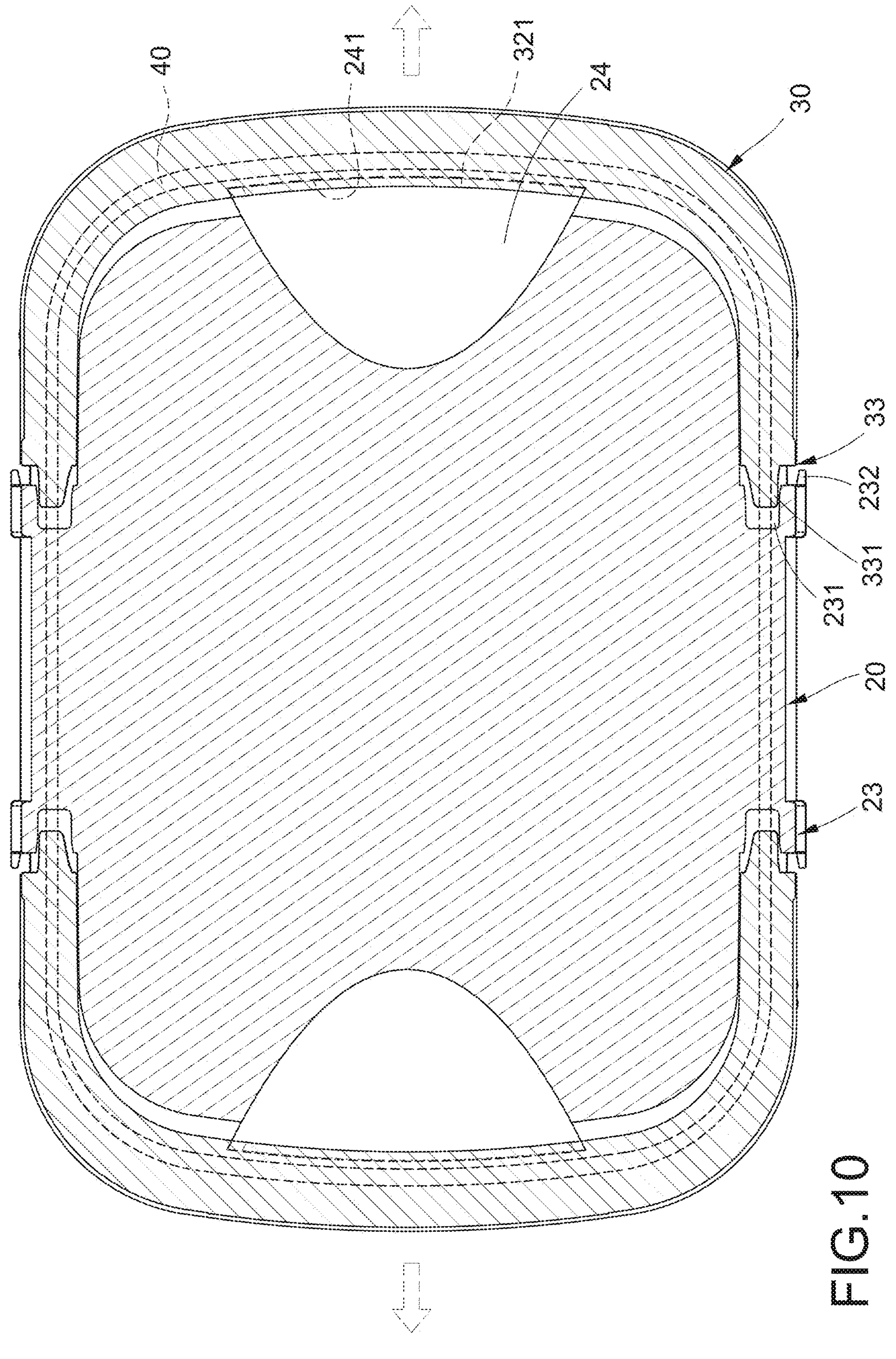
FIG. 10 is a cross-sectional top view of the present disclosure at the unlocked position.
Figure 11:
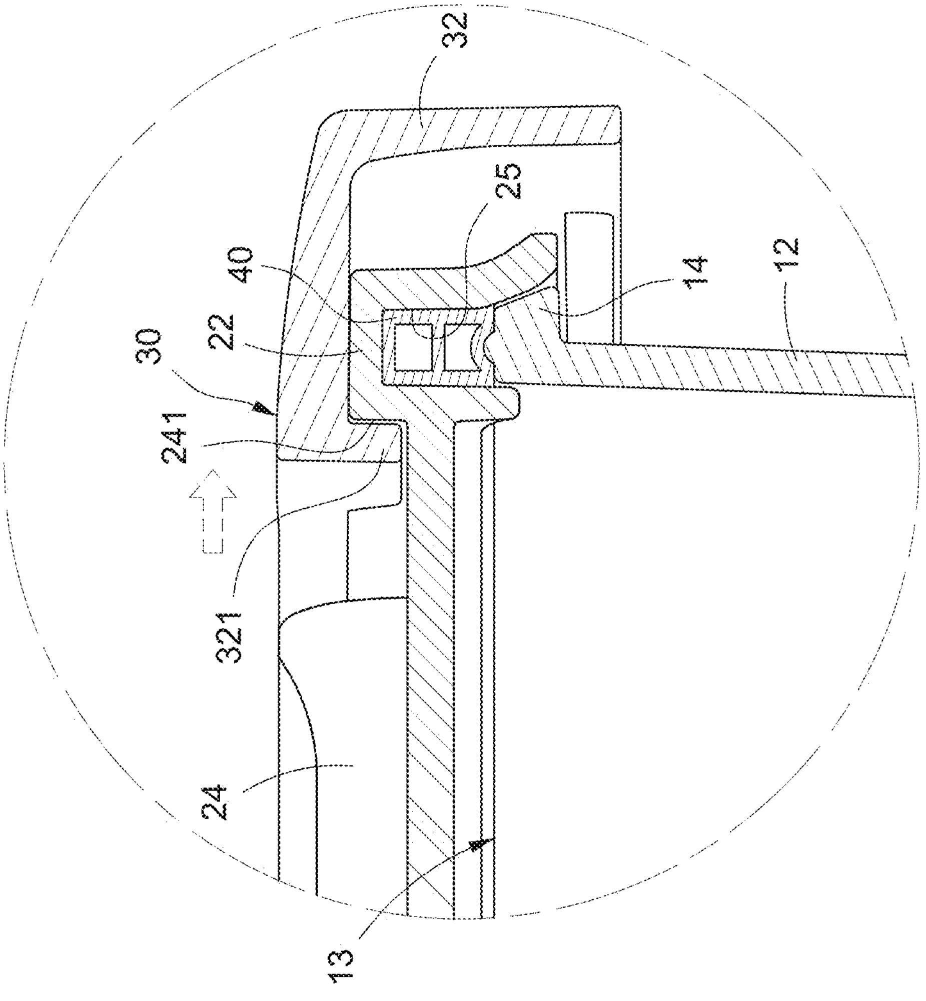
FIG. 11 is a partial cross-sectional side view of the present disclosure at the unlocked position.
Figure 12:
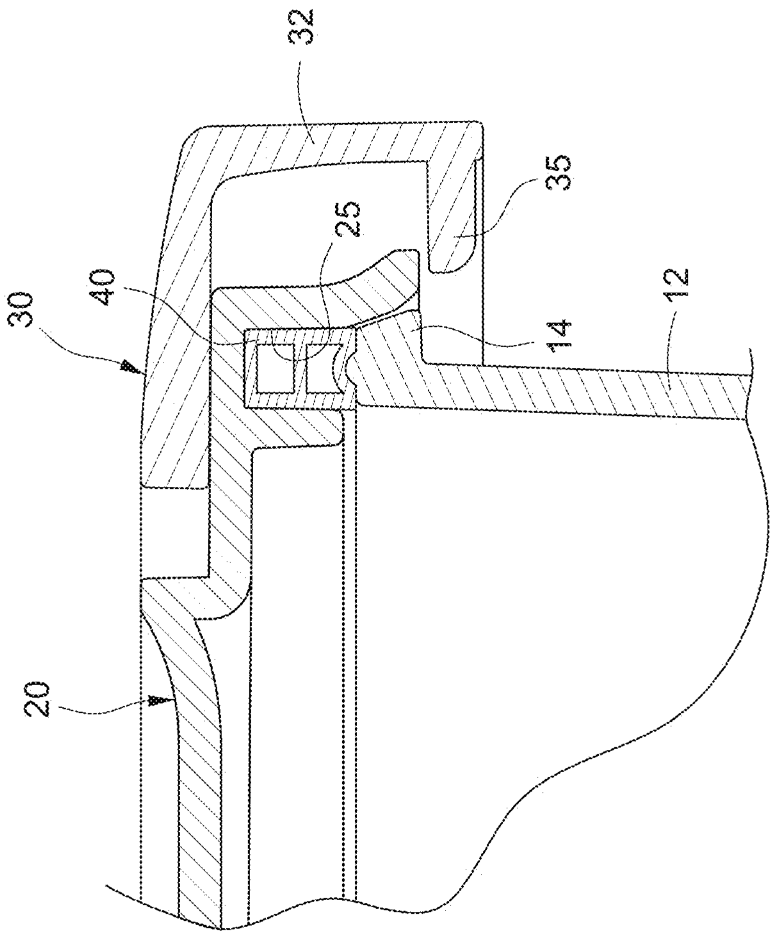
FIG. 12 is another partial cross-sectional side view of the present disclosure at the unlocked position.
Figure 13:
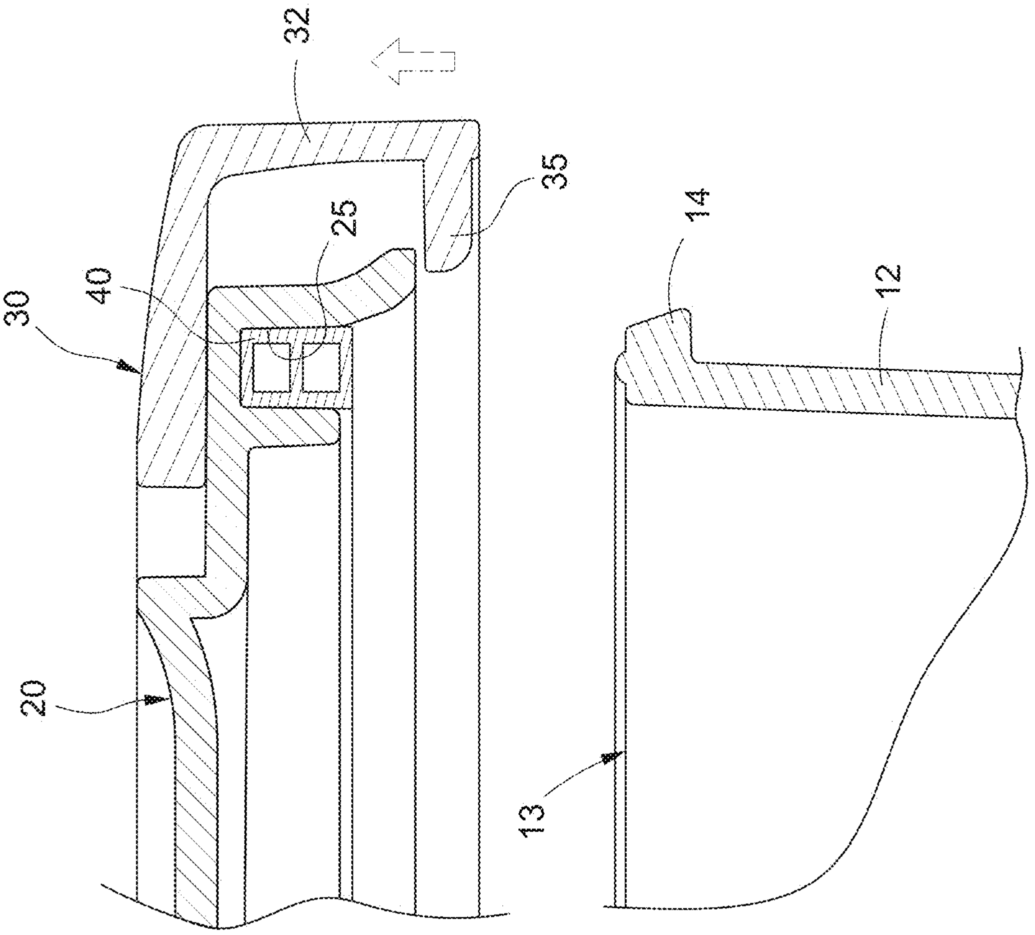
FIG. 13 is an exploded view of the upper cover, the sliding sleeves, and the box body of the present disclosure.

Please refer to FIG. 4 and FIG. 10, each sliding sleeve 30 may slide along the first side frames 21 to switch between a locked position and an unlocked position. Please refer to FIGS. 4, 5, 6, 7, 8, and 9, when each sliding sleeve 30 is at the locked position, each positioning piece 331 is inserted and fixed in each slot 231, each limiting side-cover 232 blocks an outside of each plug end 33, each plug end 33 is respectively abutted against each corresponding limiting portion 23, each anti-lift plate 35 blocks a lower portion of each flange 14 to retain the downward movement of the flange 14 along the vertical direction D (shown in FIG. 9), each second fixed structure 34 is locked with each first fixed structure 15. Please refer FIGS. 10, 11, 12, and 13, when each sliding sleeve 30 slides to the unlocked position, each plug end 33 is separated from each limiting side-cover 232, each anti-lift plate 35 is separated from each flange 14, each second fixed structure 34 is separated from each first fixed structure 15, thus the upper cover 20 and the sliding sleeves 30 may separate from the box body 10 (as shown in FIG. 13). As such, the upper cover 20 and the sliding sleeves 30 may lock or unlock on the box body 10 by sliding the sliding sleeves 30 to switch between (move between) the locked position and the unlocked position. Namely, the upper cover 20 and the sliding sleeves 30 may quickly and easily lock and unlock on the box body 10, and the crisper box of the present disclosure can avoid the sliding sleeves 30 from shaking in any direction—left, right, front, back, or up and down—relative to the upper cover 20 or the box body 10 when the sliding sleeves 30 are locked.

It is worth noting that each positioning piece 331 in the embodiment is still inserted in but not fixed in each slot 231 when the sliding sleeves 30 are at the unlocked position, but the scope of the present disclosure is not limited to this embodiment. For example, each positioning piece 331 may also be totally separated from each slot 231 when the sliding sleeves 30 are at the unlocked position, this total separation between the positioning piece 331 and the slot 231 does not affect the unlocking of the upper cover 20 and the sliding sleeves 30 relative to the box body 10.

Details are provided as follows. Please refer FIGS. 2, 3, 4, 9, 10, and 12, in each sliding sleeve 30, the anti-lift plate 35 is extended from an inner wall of the connecting strip 32 and is misaligned (staggered) with the flange 14 in the vertical direction D. In detail, the anti-lift plate 35 in each sliding sleeve 30 is parallel to the flange 14 and lower than the flange 14. Therefore, the anti-lift plate 35 may block a lower portion of the flange 14 to prevent the upper cover 20 and the sliding sleeves 30 from separating from the box body 10 along the vertical direction D when the sliding sleeves 30 are at the locked position. In the embodiment, the number of the anti-lift plate 35 in each sliding sleeve 30 is two, and the anti-lift plates 35 in each sliding sleeve 30 are arranged at intervals on an inner wall of the connecting strip 32, but the scope of the present disclosure is not limited to this embodiment. For example, the number of the anti-lift plate 35 in each sliding sleeve 30 also may be one or more than three, as long as the anti-lift plate 35 may effectively achieve a blocking effect to the flange 14.

Please refer FIG. 2 and FIG. 6, the specific structures and the positions of each first fixed structure 15 and each second fixed structure 34 are described as follows. In the embodiment, the number of the second fixed structure 34 in each sliding sleeve 30 is two, and the second fixed structures 34 in each sliding sleeve 30 are arranged on an inner wall of each side strip 31, but the scope of the present disclosure is not limited to this embodiment. Each first fixed structure 15 is for example a clamping strip. Two ends of each clamping strip are extended toward the two opposite sliding sleeves 30 and the two ends respectively has a first clamping slope 151. Each second fixed structure 34 is for example a wedge block. A side of the wedge block facing to the clamping strip of each wedge block has a second clamping slope 341. As such, each first clamping slope 151 and each second clamping slope 341 are relatively complementary and arranged in parallel. Each second clamping slope 341 is buckled with each first clamping slope 151 to fix each sliding sleeve 30 on the box body 10 when each sliding sleeve 30 is at the locked position. Each second clamping slope 341 is separated from each first clamping slope 151 to release the locking between each sliding sleeve 30 and the box body 10 when each sliding sleeve 30 is at the unlocked position.

Figure 6:
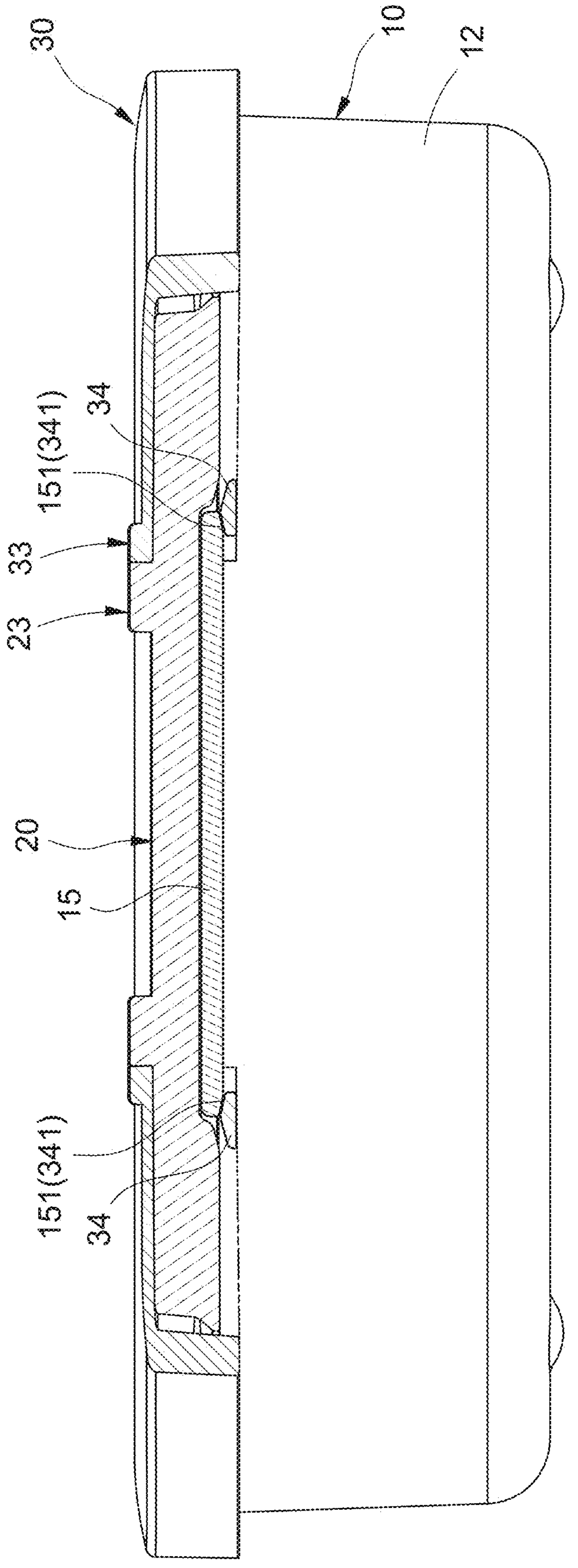
FIG. 6 is a cross-sectional side view of the present disclosure at the locked position.
Figure 7:
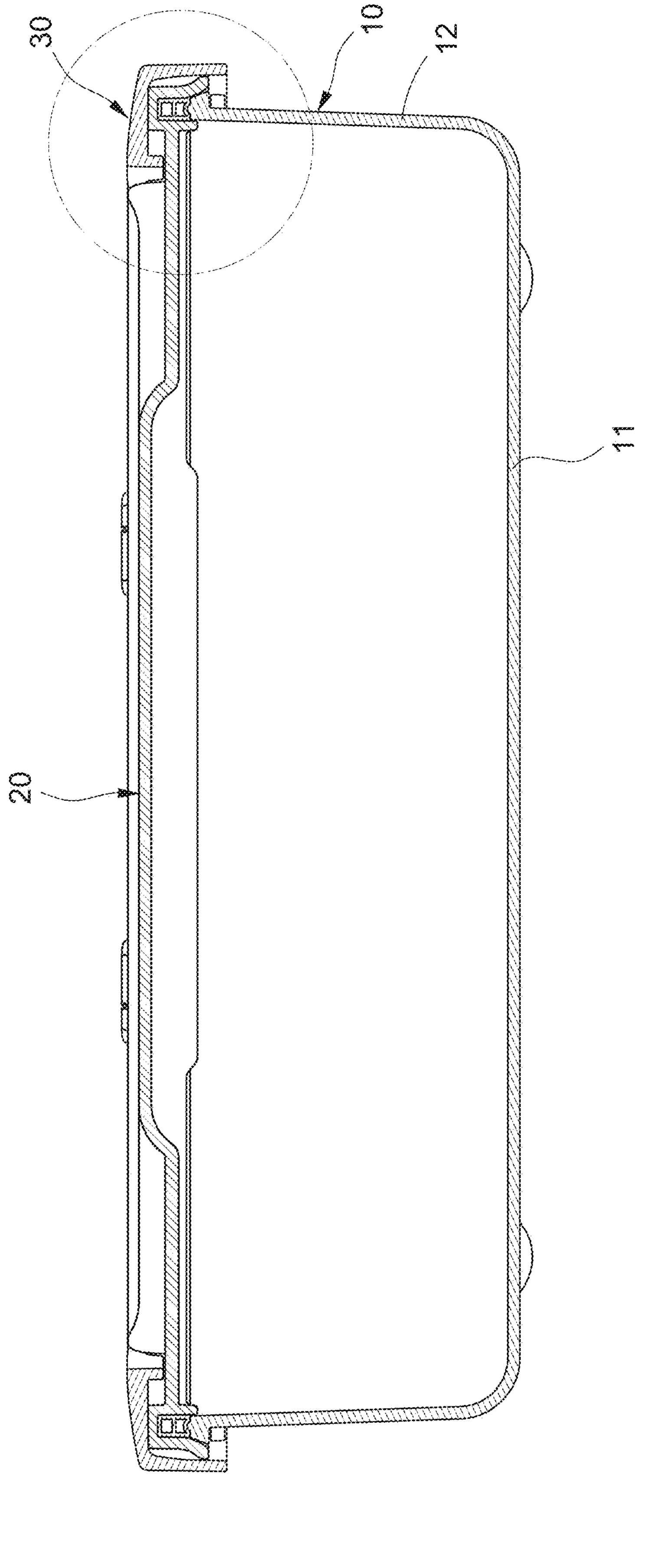
FIG. 7 is another cross-sectional side view of the present disclosure at the locked position.

With reference also to FIG. 6, since the wedge blocks of the second fixed structures 34 in the embodiment are lower than the clamping strips of the first fixed structures 15, the first clamping slopes 151 in the embodiment are separately located under the clamping strips of the first fixed structure 15, and the second clamping slopes 341 in the embodiment are separately located on the wedge blocks of the second fixed structures 34. As such, the first clamping slopes 151 and the second clamping slopes 341 may guide each other when the sliding sleeves 30 slide toward the limiting portions 23 (i.e., slide from the unlocked position to the locked position), thus the wedge blocks of the second fixed structure 34 may slide smoothly until they are fixed below the clamping strips of the first fixed structures 15.

Figure 5:
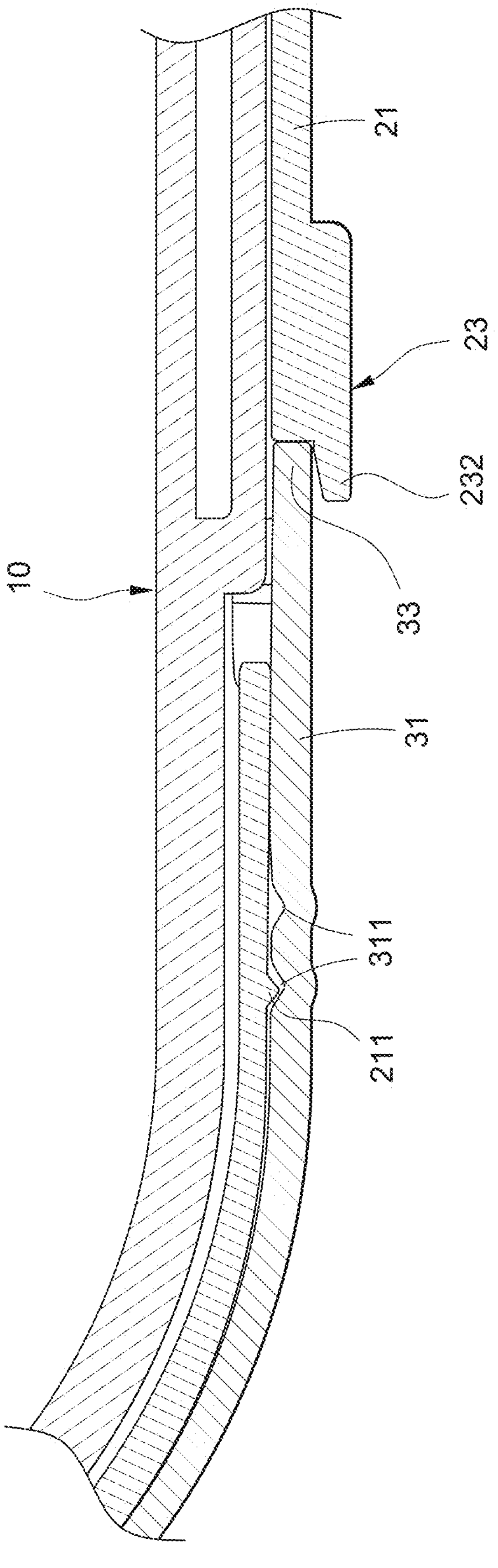
FIG. 5 is another cross-sectional top view of the present disclosure at the locked position.

Please refer FIGS. 2, 3, and 5, each first side frame 21 has a pair of positioning convex-strips 211. Each side strip 31 has a pair of positioning notches 311 arranged at intervals. In detail, the positioning convex-strips 211 in each first side frame 21 are arranged corresponding to the limiting portions 23, the positioning convex-strips 211 are extended along vertical direction on the first side frames 21 and the positioning notches 311 are extended along vertical direction on the side strips 31. Each positioning convex-strip 211 is selectively stuck inside one of the positioning notches 311 of the corresponded side strip 31. As such, each positioning convex-strip 211 is stuck inside the positioning notch 311 adjacent to the corresponded plug end 33 when the sliding sleeves are at the locked position. Each positioning convex-strip 211 is stuck inside the positioning notch 311 away from the corresponded plug end 33 when the sliding sleeves are at the unlocked position. That is, the sliding sleeves 30 may achieve a positioning effect either it is at the locked position or at the unlocked position, thus a user may know whether the sliding sleeves 30 are at the locked position or at the unlocked position through a feedback tactile sensation of the positioning convex-strips 211 being stuck into one of the positioning notches 311 when operating.

Details are provided as follows. Please refer FIGS. 1, 2, 7, 8, and 11, the upper cover has a pair of indentations 24. Each indentation 24 is arranged beside each second side frame 22, and one side of the indentation 24 facing to the corresponded second side frame 22 of each indentation 24 has a stopping surface 241. A top of each connecting strip 21 has a barb 321. Each barb 321 is buckled with each stopping surface 241 of the corresponded indentations 24 when the sliding sleeves 30 are at the unlocked position, thus each sliding sleeve 30 is longitudinally restricted to prevent detaching from the upper cover 20.

Figure 8:
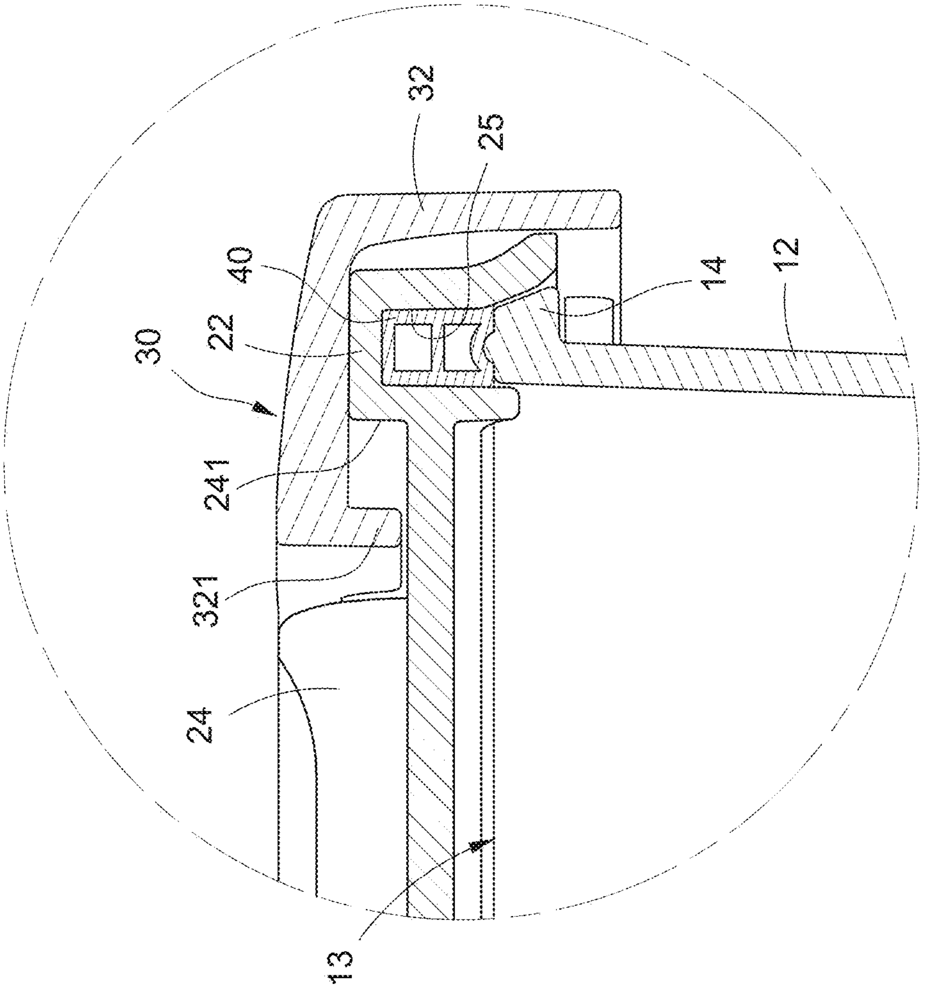
FIG. 8 is a partially enlarged view of FIG. 7.

Please refer FIGS. 2, 3, and 8, the sliding-locking crisper box of the present disclosure further includes a sealing ring 40. In the embodiment, the sealing ring 40 is a silicone ring or a rubber ring, but the present disclosure is not limit to this. The upper cover 20 has a groove 25 that is generally rectangular. The sealing ring 40 is fixed in the groove 25 and elastically abutting between the upper cover 20 and the surrounding wall 12 to achieve a sealing effect between the upper cover 20 and the box body 10. In the embodiment, the groove 25 is extended upward from a bottom surface of the upper cover 20, thus the sealing ring 40 is elastically abutted on a top end of the surrounding wall 12, but the scope of the present disclosure is not limit to this embodiment. For example, the groove 25 may also be extended inward from an outside surface of the upper cover 20 to make the sealing ring 40 to elastically abut on an inside surface of the surrounding wall 12, or the groove 25 may also be extended outward from an inside surface of the upper cover 20 to make the sealing ring 40 to elastically abut on an outside surface of the surrounding wall 12. It is worth noting that each second clamping slope 341 is respectively buckled with each corresponded first clamping slope 151 to propel the box body 10 upward along the vertical direction D when the sliding sleeves 30 are at the locked position, thus the sealing ring 40 is elastically abutted between the upper cover 20 and the surrounding wall 12 to effectively ensure a good sealing effect.

It shall be understood that the present disclosure may have other types of embodiments, and a person with ordinary skills in the art of the technical field of the present disclosure may make various changes and modifications corresponding to the present disclosure without deviating the principle and substance of the present disclosure; however, such corresponding changes and modification shall be considered to be within the claimed scope of the present disclosure.

What is claimed is:

1. A sliding-locking crisper box, comprising:

a box body, comprising a bottom plate, a surrounding wall around the bottom plate, an opening defined by the surrounding wall, a flange extended from the opening of the surrounding wall and extended toward an outside of the box body, and two first fixed structures respectively arranged on opposite sides of the flange, each of the first fixed structures is a clamping strip, two ends of each of the clamping strips respectively comprises a first clamping slope;

an upper cover, configured to hermetically cover the opening along a vertical direction, the upper cover comprising a pair of opposite first side frames and a pair of opposite second side frames, each of the first side frames comprising a pair of limiting portions, each of the limiting portions comprising a slot and a limiting side-cover; and a pair of sliding sleeves, arranged opposite to each other in correspondence with the second side frames, each of the sliding sleeves configured to slide along the first side frames to switch between a locked position and an unlocked position, each of the sliding sleeves comprising a pair of plug ends, a second fixed structure, and an anti-lift plate, each of the plug ends comprising a positioning piece, each of the second fixed structures is a wedge block, each of the wedge blocks comprises a second clamping slope;

wherein when each of the sliding sleeves is at the locked position, each of the positioning pieces is inserted and fixed in each of the slots, each of the limiting side-covers is configured to block an outside of each of the plug ends, each of the anti-lift plates is configured to block the flange along the vertical direction, each of the second clamping slopes is buckled with each of the first clamping slopes to fix each of the sliding sleeves on the box body;

wherein when each of the sliding sleeves is at the unlocked position, each of the plug ends is separated from each of the limiting side-covers, each of the anti-lift plates is separated from the flange, each of the second clamping slopes is separated from each of the first clamping slopes.

2. The sliding-locking crisper box according to claim 1, wherein each of the sliding sleeves comprises a pair of side strips and a connecting strip, the connecting strip is arranged corresponding to one of the second side frames, each of the side strips is connected to one of two ends of the connecting strip and covers a part of each first side frame, each of the plug ends is arranged on an end of each of the side strips away from the connecting strip.

3. The sliding-locking crisper box according to claim 2, wherein in each of the sliding sleeves, the anti-lift plate is extended from an inner wall of the connecting strip and is misaligned with the flange in the vertical direction.

4. The sliding-locking crisper box according to claim 2, wherein in each of the sliding sleeves, a number of the second fixed structure is two, each of the second fixed structures is arranged on an inner wall of each of the side strips.

5. The sliding-locking crisper box according to claim 2, wherein each of the first side frames comprises a pair of positioning convex-strips, each of the positioning convex-strips is arranged corresponding to each of the limiting portions, each of the side strips comprises a pair of positioning notches arranged at intervals, each of the positioning convex-strips is selectively stuck inside one of the positioning notches of the corresponded side strip.

6. The sliding-locking crisper box according to claim 2, wherein the upper cover comprises a pair of indentations, each of the indentations is arranged beside each of the second side frames, each of the indentations comprises a stopping surface, each of the connecting strips comprises a barb, each of the barbs is buckled with corresponding one of the stopping surfaces when each of the sliding sleeves is at the unlocked position.

7. The sliding-locking crisper box according to claim 2, wherein each of the positioning pieces is extended from the corresponded plug end along the first side frames.

8. The sliding-locking crisper box according to claim 1, wherein each of the plug ends is abutted against a corresponding one of the limiting portions when each of the sliding sleeves is at the locked position.

9. The sliding-locking crisper box according to claim 1, further comprising a sealing ring, wherein the upper cover comprises a groove, the sealing ring is fixed in the groove and elastically abutted between the upper cover and the surrounding wall.

* * * * *